United States Patent [19]

Curtis

[11] 4,245,537

[45] Jan. 20, 1981

[54] OPTICAL FIBER SCORING TOOL

[76] Inventor: Lyn Curtis, 17 Oaklawn Rd., Fair Haven, N.J. 07701

[21] Appl. No.: 70,976

[22] Filed: Aug. 30, 1979

[51] Int. Cl.³ .............................................. B26D 3/08
[52] U.S. Cl. ...................................... 83/879; 83/186; 83/439; 83/646; 225/96
[58] Field of Search ............ 83/186, 187, 199, 411 R, 83/439, 580, 646, 647.5, 733, 861, 879, 883, 884, 886, 926 B, 926 C; 144/28.11, 28.3, 28.6, 28.72; 225/2, 96, 96.5; 350/96.20, 320

[56] References Cited

U.S. PATENT DOCUMENTS

| | | | |
|---|---|---|---|
| 2,334,577 | 11/1943 | Postlewaite | 83/883 |
| 2,613,645 | 10/1952 | Kameniczky | 144/28.11 |
| 3,268,137 | 8/1966 | Martin | 225/96.5 X |
| 3,679,109 | 7/1972 | King | 225/96.5 X |
| 3,759,127 | 9/1973 | Mills | 83/646 X |
| 3,934,773 | 1/1976 | Chinnock et al. | 225/96.5 X |
| 4,021,886 | 5/1977 | Crepeau | 83/879 X |
| 4,203,539 | 5/1980 | Miller | 225/96.5 X |

OTHER PUBLICATIONS

*Bell System Technical Journal*, vol. 52, No. 9, Nov. 1973, pp. 1579-1588, "Optical Fiber End Preparation for Low-Loss Splices".

*Primary Examiner*—Frank T. Yost
*Assistant Examiner*—Robert P. Olszewski
*Attorney, Agent, or Firm*—David R. Padnes

[57] ABSTRACT

A two-piece tool for circumferentially scoring an optical fiber (11). Retaining member (21) has a substantially flat end surface (26) beyond which a portion (13) of the optical fiber protrudes perpendicularly. The scoring ring holder (28) floatably mounts a scoring ring (30). When the retaining member is inserted into the scoring ring holder, the portion (13) of the optical fiber extends into the scoring ring. A preselected relative orbital motion between the retaining member and scoring ring holder causes the scoring ring to revolve about the optical fiber scoring a line about the fiber circumference.

5 Claims, 8 Drawing Figures

OPTICAL FIBER SCORING TOOL

TECHNICAL FIELD

This invention relates to an apparatus which scores a line about the circumference of an optical fiber to facilitate an even break completely through the fiber upon deflection of the same.

BACKGROUND OF THE INVENTION

The use of optical fibers in telecommunication applications requires the ability to install optical connectors in the field. While several field installable optical connectors are available, a low-loss optical connection requires the end face to be flat and perpendicular to the fiber axis. Preparation of the fiber end can be accomplished in a laboratory environment by either controlled breaking or sawing followed by polishing. At present, these operations are performed using laboratory tools and fixtures which are not suitable for field use. For example, see Bell System Technical Journal, Vol. 52, No. 9, Nov. 1973, entitled "Optical Fiber End Preparation for Low-Loss Splices" by D. Gloge, P. W. Smith, D. L. Bisbee and E. L. Chinnock.

SUMMARY OF THE INVENTION

Precise circumferential scoring of an optical fiber is accomplished through the use of a compact two-piece tool comprising a fiber retaining member and a fiber scoring ring holder. The fiber retaining member holds an optical fiber with the fiber end extending from and substantially perpendicular to a flat end surface of the retaining member. The scoring ring holder floatably mounts a scoring ring. When the retaining member is inserted into the scoring ring holder, a portion of the optical fiber extends into the scoring ring. A preselected relative orbital motion between the retaining member and scoring ring holder, causes the scoring ring to revolve about the fiber scoring a line about the fiber circumference.

After a continuous line is scored about the fiber circumference, the fiber retaining means is removed from the scoring ring holder. A slight deflection of the fiber end then causes a clean break completely through the fiber.

It is a feature of the present invention that the aforementioned apparatus and technique is particularly suitable for field use.

It is a further feature of the present invention that the fiber retaining means provides a convenient fixture for lapping and polishing the fiber end.

DETAILED DESCRIPTION

Figure 1:
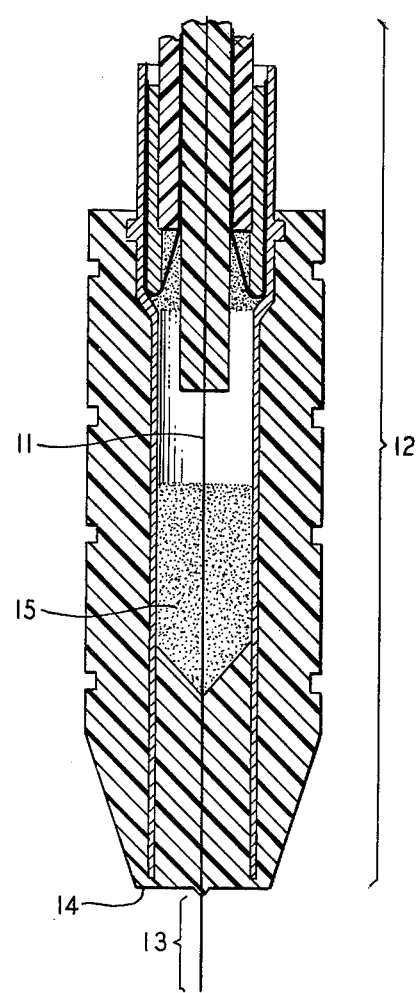
FIG. 1 shows a cross sectional view of an optical connector plug containing a protruding optical fiber.

As shown in FIG. 1, optical fiber 11 is inserted through male optical connector plug 12. A portion 13 of fiber 11 extends from and is substantially perpendicular to end face 14 of plug 12. This position of fiber 11 is permanently secured through the use of epoxy 15. Further details on male connector plug 12 may be found in a pending patent application to P. K. Runge filed Nov. 11, 1975, Ser. No. 630,930 now abandoned, and assigned to the present assignee.

Figure 2:
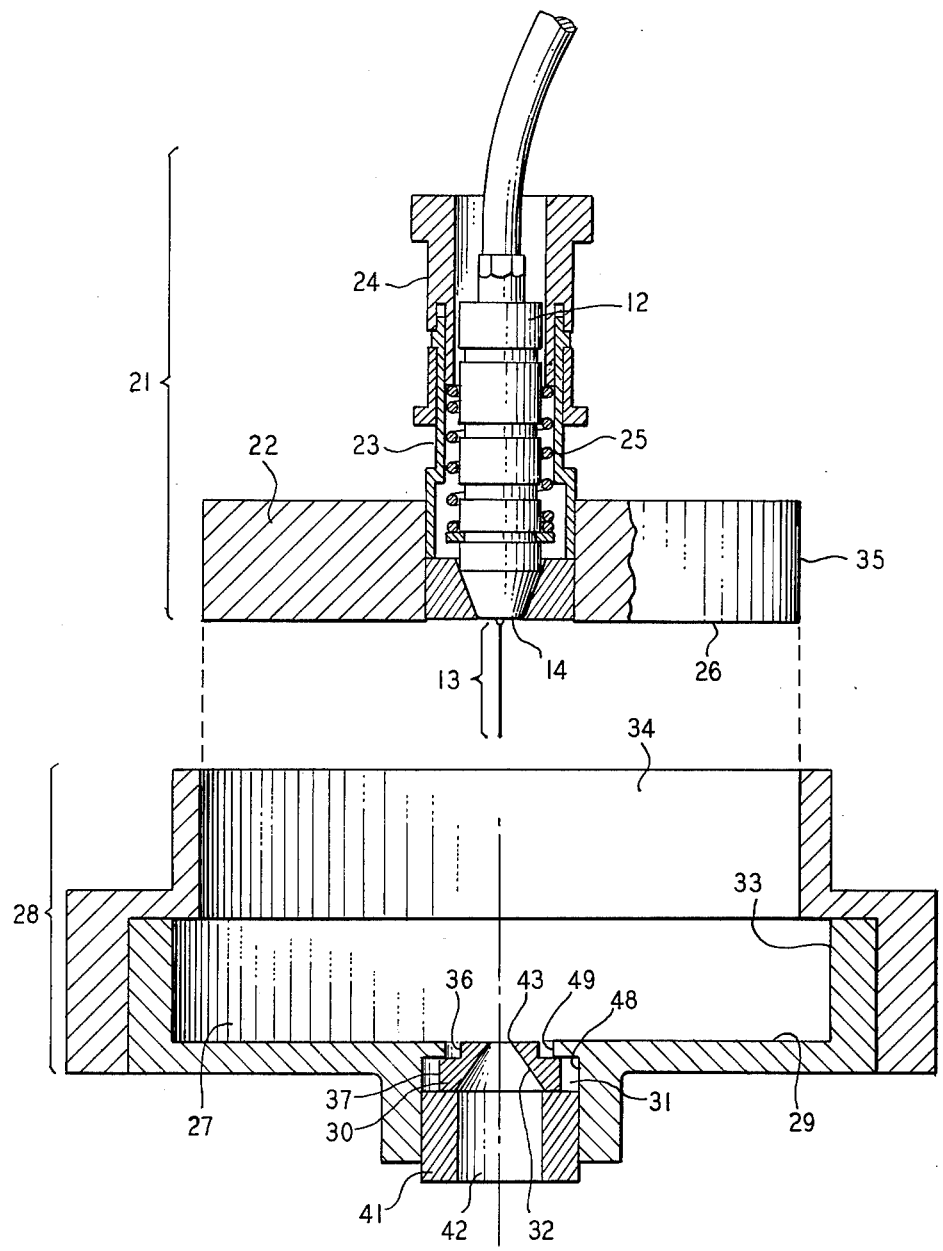
FIG. 2 shows a cross sectional view of the two-piece scoring tool containing the plug and fiber of FIG. 1.

Plug 12 containing fiber 11 is mounted into fiber retaining member 21 as illustrated in FIG. 2. Retaining member 21 is comprised of element 22 and coupling member 23 rigidly affixed thereto. Second coupling member 24 and spring 25 slide over plug 12 and engage coupling member 23 to maintain end face 14 substantially flush with surface 26. In addition, the portion 13 of fiber 11 is retained substantially perpendicular to surface 26. Satisfactory models of coupling member 23, second coupling member 24 and spring 25 have been respectively realized using a pair of mating BNC type connectors and a coil spring.

It will, of course, be obvious to those skilled in the art that while the described retaining member was designed for a particular optical fiber connector, the invention described herein is applicable for any optical fiber connector or for an optical fiber alone.

Figure 3:
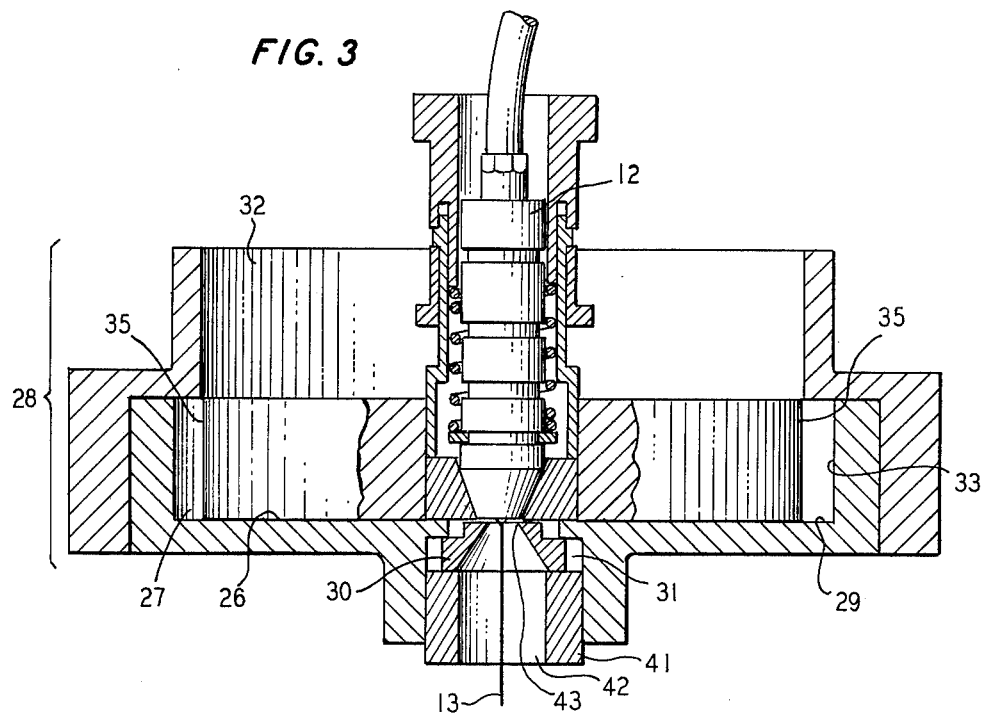
FIG. 3 shows the relative position of the two-piece fiber scoring tool at the beginning of the scoring operation.

Retaining member 21 is configured to be insertable into first cavity 27 within scoring ring holder 28. Guiding cavity 34, with a smaller crosssectional area than cavity 27, facilitates this insertion. When retaining member 21 is fully inserted into first cavity 27, fiber portion 13 extends into scoring ring 30 and surface 26 of retaining member 21 is in contact with bottom 29 of cavity 27. This relationship is illustrated in FIG. 3. Bottom 29, as shown, is preferably a continuous flat surface.

Ring 30 is floatably mounted within second cavity 31 which extends from bottom 29 of first cavity 27. Retaining plug 41 supports ring 30 and has an aperture 42 which accepts fiber portion 13. The aperture wall 32 of ring 30 are coated with an abrasive substance such as 3 micrometer ($\mu$m) diamond particles. Moreover, the aperture of ring 30 is preferably frustoconical, with the smaller cross section toward bottom 29, thereby forming a fine cutting edge 43.

The actual scoring of a line about the circumference of fiber portion 13 is achieved by imparting a preselected orbital motion to retaining member 21 relative to scoring ring holder 28. Of course, this preselected orbital motion can also be applied to scoring ring holder 28 while retaining member 21 is maintained in a stationary position. Orbital motion for purposes of the present invention comprises both circular and noncircular motion or a combination, thereof. This preselected orbital motion must be sufficient to cause the contact of the circumference of fiber portion 13 with the aperture wall 32 of scoring ring 30. It should, of course, be understood that this preselected orbital motion is limited by the contact of circumferential walls 35 of retaining member 21 against sidewalls 33 of first cavity 27.

Figure 4:
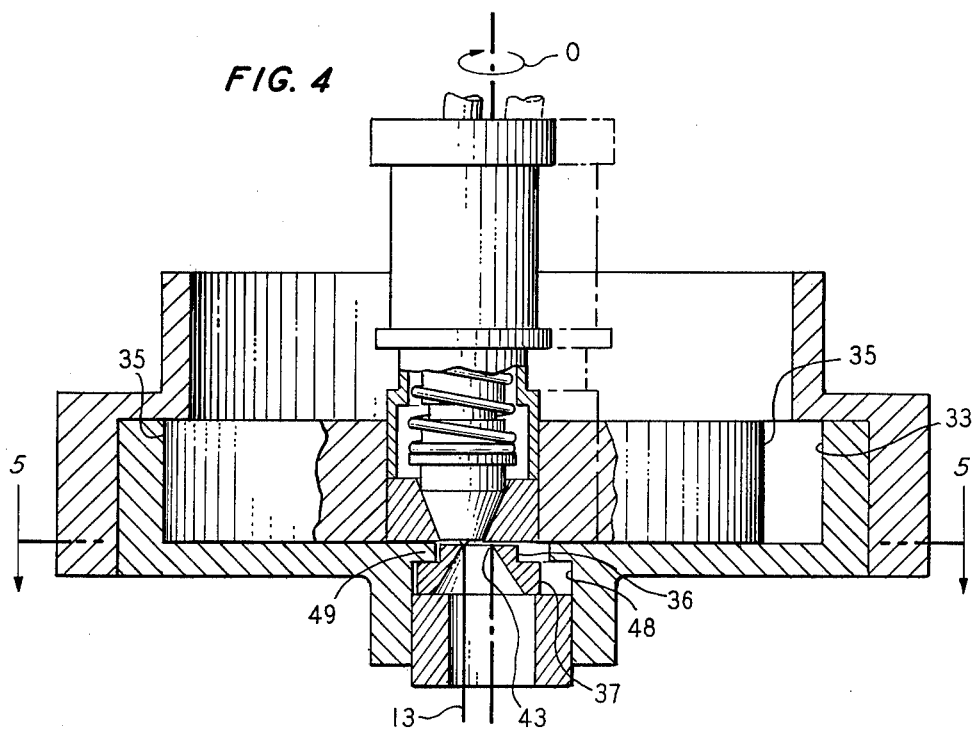
FIG. 4 depicts the two-piece fiber scoring tool during the scoring operation.
Figure 5:
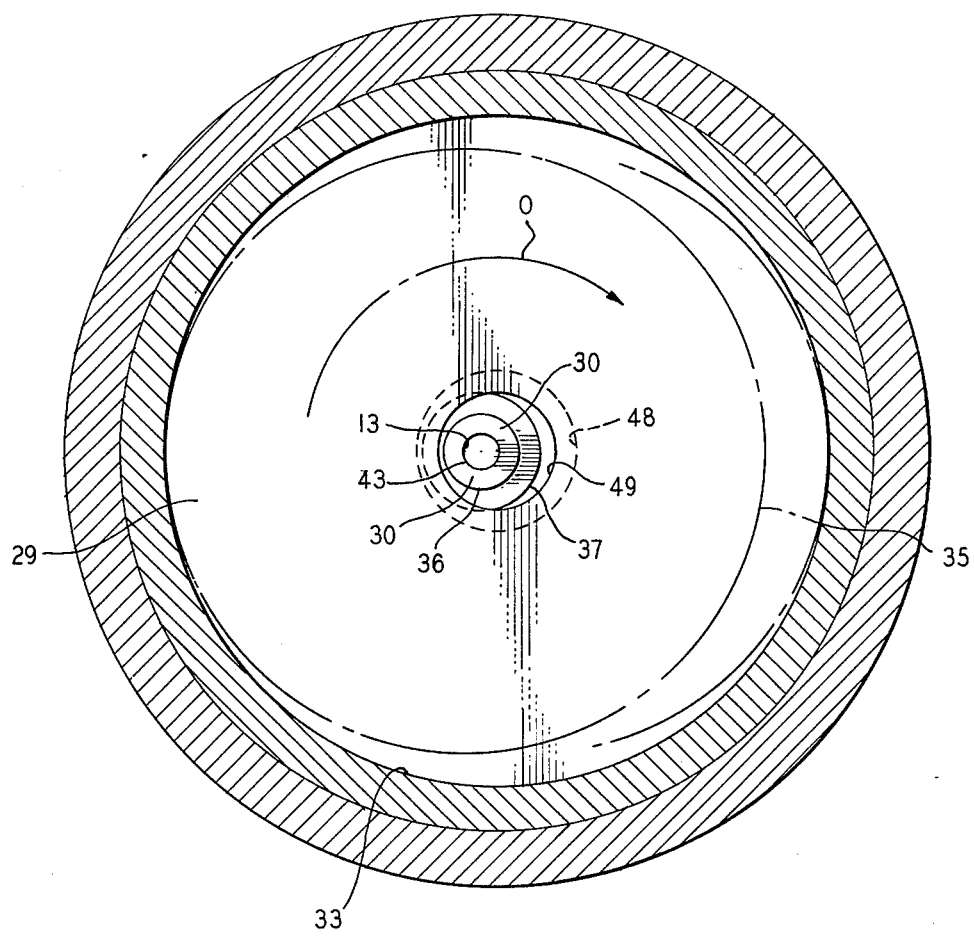
FIG. 5 is a fragmentary sectional view taken along the line 5—5 of FIG. 4 showing the relative positions of the optical fiber and scoring ring.

For purposes of illustration, FIGS. 4 and 5 show the relationship of retaining member 21 relative to scoring ring holder 28 under maximum orbital motion O. It should be noted that while fiber portion 13 is in contact with ridge 43 of scoring ring 30, the outside circumferential walls 36, 37 of ring 30 are not in contact with sidewalls 48 and 49, respectively, of second cavity 31. Scoring ring 30 can, therefore, freely follow the motion of fiber portion 13 and revolve about the same. This free floating motion provides a gentle scoring action without breaking the delicate fiber portion 13.

The above described freely revolving motion of scoring ring 30 is achieved by selecting the clearance between the outside circumferential walls 36 and 37 of ring 30 and sidewalls 48, 49, respectively, to be greater than the clearance between circumference walls 35 of retaining member 21 and sidewalls 33 of first cavity 27. In addition, to assure the contact of a portion of the aperture wall 32, of ring 30, with the fiber circumference, the clearance between the same must be less than the clearance between sidewalls 35 or retaining member 21 and sidewalls 33 of first cavity 27.

Figure 6:
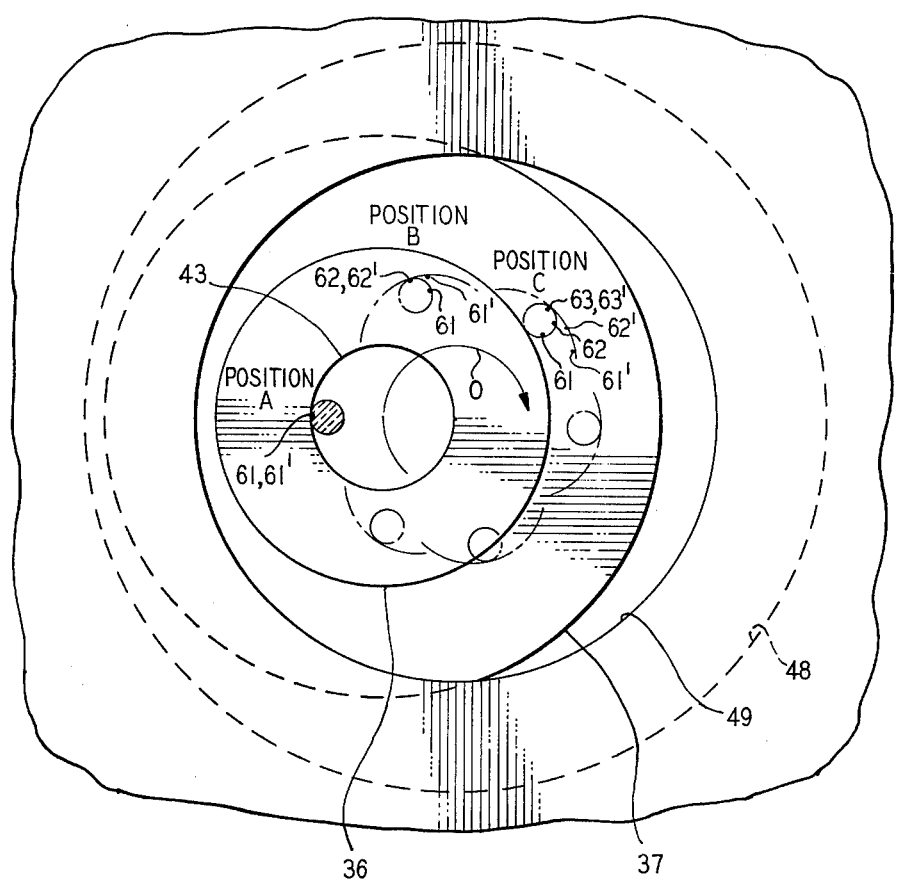
FIG. 6 is an enlarged progressive representation of the pertinent portion of FIG. 5 illustrating the relative positions of the scoring ring and optical fiber during the scoring operation.
Figure 7:
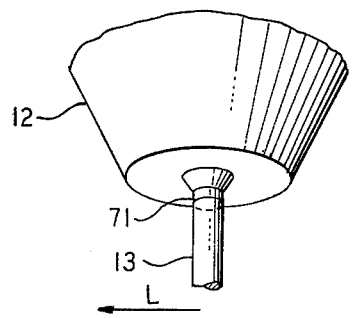
FIG. 7 is a perspective view of the optical connector plug and scored optical fiber.
Figure 8:
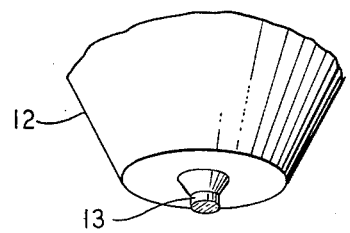
FIG. 8 is a perspective view of the optical connector plug and optical fiber with a break completely through the fiber cross section caused by deflection of the scored fiber end.

An enlarged end face of a progressive movement of fiber portion 13 and ring 30 is depicted in FIG. 6. At position A, points 61 and 61' of fiber portion 13 and the aperture of scoring ring 30, respectively, are in contact. As orbital motion O continues, the positions of fiber portion 13 and ring 30 are shown in phantom at position B. Point 62 on the circumference at fiber portion 13 is now in contact with point 62' of the aperture of ring 30. At position C, the common points of contact are 63 and 63' for fiber 13 and ring 30, respectively. Therefore, as orbital motion O continues, ring 30 slowly revolves about the circumference of fiber portion 13 contacting a series of points on the fiber circumference. After several complete revolutions of retaining means 21 within scoring ring holder 28 a continuous line 71 is scored about the fiber circumference as shown in FIG. 7. Subsequent lateral deflection in the direction L of fiber portion 13 causes a clear break, as depicted in FIG. 6, of the fiber at the position of line 71.

After a complete break is made through the fiber, retaining member 21 is removed from scoring holder 28. A highly polished fiber end face, if desired, may then be achieved by lapping and polishing. Retaining member 21 provides a convenient fixture for holding optical fiber 11 during these operations. A satisfactory model of the above described embodiment of a two piece optical fiber scoring tool was fabricated using stainless steel and aluminum.

I claim:
1. Apparatus for circumferentially scoring an optical fiber CHARACTERIZED BY
   fiber retaining means (21) having a flat end surface (26) beyond which a portion (13) of the retained fiber (11) protrudes perpendicularly,
   a scoring ring holder (28) having a first cavity (27) into which said retaining means is received with said flat end surface being in sliding contact with the bottom (29) of said first cavity, said holder having a second cavity (31) extending from the bottom of the first cavity, and
   a scoring ring (30) floatably mounted within said second cavity having a scoring aperture which receives said protruding portion of the optical fiber when said retaining means is inserted into said first cavity, the fit of said retaining means within said first cavity being sufficient to allow a preselected relative orbital motion between said retaining means and said ring holder to cause said scoring ring to freely revolve about the fiber and score a line about the fiber circumference.

2. The apparatus of claim 1 wherein said aperture of said scoring ring has a frustoconical cross-section with the smaller cross section toward said bottom of said first cavity.

3. The apparatus of claim 1 wherein said scoring ring holder further includes means (34) for guiding the insertion of said retaining means into said first cavity.

4. The apparatus of claim 1 wherein said bottom of said first cavity is a flat surface.

5. Apparatus for circumferentially scoring an optical fiber CHARACTERIZED BY
   fiber retaining means (21) having a flat end surface (26) beyond which a portion (13) of the retained fiber (11) protrudes perpendicularly
   a scoring ring holder (29) having a flat bottomed first cavity (27) into which said retaining means is received with said flat end surface being in sliding contact with the flat bottom, said holder having a flat bottomed second cavity (31) extending from bottom (29) of the first cavity, and
   a scoring ring (30) floatably mounted within said second cavity having a scoring aperture which receives said fiber portion when said retaining means is inserted into said first cavity, said fiber retaining means capable of a relative oribital motion within said first cavity to cause said scoring ring to freely revolve about the fiber and score a line about the fiber circumference.

* * * * *

UNITED STATES PATENT AND TRADEMARK OFFICE
CERTIFICATE OF CORRECTION

PATENT NO. : 4,245,537
DATED : January 20, 1981
INVENTOR(S) : Lyn Curtis

It is certified that error appears in the above-identified patent and that said Letters Patent are hereby corrected as shown below:

Column 4, line 39, (29) should read --(28)--.

Signed and Sealed this

Eighth Day of September 1981

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,245,537
DATED : January 20, 1981
INVENTOR(S) : Lyn Curtis

It is certified that error appears in the above—identified patent and that said Letters Patent is hereby corrected as shown below:

On the title page insert --(73) Assignee: Bell Telephone Laboratories, Incorporated, Murray Hill, N.J. --.

Signed and Sealed this

Eighth Day of December 1981

[SEAL]

Attest:

GERALD J. MOSSINGHOFF

*Attesting Officer*     *Commissioner of Patents and Trademarks*